US009633200B2

(12) United States Patent
Kulkarni et al.

(10) Patent No.: US 9,633,200 B2
(45) Date of Patent: Apr. 25, 2017

(54) MULTIDIMENSIONAL SANDBOXING FOR FINANCIAL PLANNING

(71) Applicant: Oracle International Corporation, Redwood Shores, CA (US)

(72) Inventors: Prasad Kulkarni, San Ramon, CA (US); Manish Kamalkishor Daga, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 97 days.

(21) Appl. No.: 14/865,164

(22) Filed: Sep. 25, 2015

(65) Prior Publication Data

US 2016/0110541 A1 Apr. 21, 2016

Related U.S. Application Data

(60) Provisional application No. 62/056,193, filed on Sep. 26, 2014.

(51) Int. Cl.
*G06F 21/00* (2013.01)
*G06F 21/53* (2013.01)

(52) U.S. Cl.
CPC .................... *G06F 21/53* (2013.01)

(58) Field of Classification Search
CPC ....................................... G06F 21/52
See application file for complete search history.

(56) References Cited

U.S. PATENT DOCUMENTS

| | | | | | |
|---|---|---|---|---|---|
| 8,601,579 | B2* | 12/2013 | Krsti | ...................... | G06F 21/53 713/164 |
| 8,954,958 | B2* | 2/2015 | Murphey | .................. | G06F 8/71 718/1 |
| 9,003,231 | B1* | 4/2015 | Graves | ................ | G06F 11/1417 714/25 |
| 9,027,078 | B1* | 5/2015 | Manmohan | ............. | G06F 21/53 726/1 |
| 9,032,066 | B1* | 5/2015 | Erdmann | ................ | G06F 21/53 709/224 |
| 2004/0139334 | A1* | 7/2004 | Wiseman | ................ | G06F 21/51 713/188 |
| 2009/0259993 | A1* | 10/2009 | Konduri | .............. | G06F 11/3664 717/127 |
| 2010/0146340 | A1* | 6/2010 | Bhate | .................. | G06F 11/3676 714/38.14 |
| 2013/0020191 | A1* | 1/2013 | Glass | ...................... | C23F 13/06 204/196.01 |
| 2015/0242502 | A1* | 8/2015 | Chadha | ............. | G06F 17/30115 707/827 |
| 2015/0358411 | A1* | 12/2015 | Kruglick | ................. | G06F 21/62 709/228 |

(Continued)

*Primary Examiner* — Ali Shayanfar
(74) *Attorney, Agent, or Firm* — Marger Johnson (57) ABSTRACT

A computer-implemented method can include creating a sandbox responsive to a sandbox creation request from a user, wherein the sandbox represents an alternate version of a base version and is accessible only by the user. The method can also include visually presenting to the user information pertaining to the sandbox and information pertaining to the base version, saving changes to the information pertaining to the sandbox, and publishing the sandbox responsive to a publish request from the user.

17 Claims, 5 Drawing Sheets

(56) References Cited

U.S. PATENT DOCUMENTS

2016/0085602 A1* 3/2016 Jacobson .............. G06F 9/546
　　　　　　　　　　　　　　　　　　　726/30
2016/0110541 A1* 4/2016 Kulkarni ............... G06F 21/53
　　　　　　　　　　　　　　　　　　　726/22

* cited by examiner

FIG. 1

Revenue Planning
Entity: Sales East, Product: Tablet, Version: Working, Market: USA, Years: FY15

| | | | | | | | | Actions ▼ | Save | Refresh | Close |
|---|---|---|---|---|---|---|---|---|---|---|---|
| | | | | | | | | Edit | | | |
| Volume | 12,000 | 12,000 | 10,000 | 34,000 | 8,000 | 1,900 | 81.49 | Adjust | | | |
| Avg Selling Price | 400 | 400 | 800 | 533.33 | 900 | 800 | 800 | Comments | | | |
| Product Revenue | 4,800,000 | 4,800,000 | 8,000,000 | 17,600,000 | 7,200,000 | 1,520,000 | 65,193.53 | Supporting Detail | | | |
| COGS % | 55% | 55% | 55% | 55% | 55% | 55% | 55% | Change History | | | |
| Cost of Sales | 2,640,000.00 | 2,640,000.00 | 4,400,000.00 | 9,680,000.00 | 3,960,000.00 | 836,000.00 | 35,856.44 | Attachments | | | |
| Gross Profit | 2,160,185.00 | 2,160,185.00 | 3,600,185.00 | 7,920,555.00 | 3,240,185.00 | 684,185.00 | 29,522.09 | Lock/Unlock Cells | | | |
| Margin % | 45% | 45% | 45% | 45% | 45% | 45% | 45% | Apply Business Rules | | | |
| Revenue Cash Flow Inc | 30 Days | 30 Days | 30 Days | 30 Days | 30 Days | 30 Days | 30 Days | Grid Validation Messages | | | |
| Machinery and Equipment | 50 | 50 | 50 | 150 | 50 | 50 | 50 | Sandbox ▲ | | | |
| Cash - Net | -1,980,050.00 | -2,640,050.00 | -800,050.00 | -5,420,150.00 | 839,950.00 | Create New — 202 | 1,484,093.56 | | | | |

MULTIDIMENSIONAL SANDBOXING FOR FINANCIAL PLANNING

CROSS-REFERENCE TO RELATED APPLICATION

This application claims the benefit of U.S. Provisional Patent Application No. 62/056,193, titled "MULTIDIMENSIONAL SANDBOXING FOR FINANCIAL PLANNING" and filed on Sep. 26, 2014, the content of which is hereby fully incorporated by reference herein.

BACKGROUND

Today's dynamic business landscape generally demands fast responses from companies in order to address both customer and market needs, typically requiring several different teams to work simultaneously on application customizations while sharing the same data model and configuration starting point. Sandboxes may be used to allow companies to meet these requirements, avoid the risk of conflicts that may result from multiple teams working in parallel, and give administrators the ability to test all customizations before end users ever see them.

Sandboxes generally provide robust out-of-the-box functionality to help isolate and control customization efforts without impacting other users' configuration environments and/or the production environment. Sandboxes generally allow users to make changes isolated from the mainline application (i.e., the source of data and definitions used at the time of creating a new sandbox) as well as from other sandboxes.

Business analysts can implement and test application customizations in a sandbox and, once satisfied, publish them back to the mainline. When making changes in a sandbox, customizations are typically not available to any other sandbox or to the mainline application until the sandbox has been published. The publishing of a sandbox generally involves the included application customizations overwriting the mainline application's existing configuration.

However, there are many use cases where users wish to make changes that they don't want others to see until they are completely satisfied with them. Consider an example in which a user for an Entity is working on his hiring plan, updating his employee headcounts, and assessing potential impacts of various combinations. To assess the complete impact on his expenses [and thus revenue] the user must save the data every time and run Rules. Once the user saves the data, it becomes available to everybody who has access to the Entity and associated accounts, which means that they could be seeing data that is not final. It should be noted that scenarios involving what-if analysis generally have this problem.

Consider another example in which a user starts with a new project and has done his Expense Planning but has yet to complete his Revenue Planning. Since the numbers for Expense Planning are saved, such data may be used in calculations that are subsequently run, a scenario the user likely wishes to avoid until the Project Planning is complete. That is, the user would have liked to work on the Plan in a separate area that doesn't affect others until the Plan is complete.

Accordingly, there remains a need for improved sandbox functionality, particularly with regard to financial-related planning.

DETAILED DESCRIPTION OF THE EMBODIMENTS

Today's dynamic business landscape demands fast responses from companies in order to address both customer and market needs, typically requiring frequent changes to corporate financial plans. Users need the ability to do what if analysis and create alternate plans based on changing customer/market needs. Sandboxes may be used to allow multiple users to work privately on their own Plans and make their Plans public only when they are ready. As used herein, a sandbox generally refers to a private area of a user in the Planning application which is not visible to others until the user wishes to make it public.

There are many use cases in which users wish to make changes that they don't want others to see until they are completely satisfied with them. For example, A business unite (BU) head for an entity may be working on his hiring plan & updating his Contract and Permanent employee headcounts while assessing the impacts of various combinations. To assess the complete impact on his expenses and, thus, revenue, he must generally save the data every time and run Rules. Once the user saves the data, it becomes available to everybody who has access to the Entity and accounts, which means that such users could be seeing data that is not final. All scenarios where what-if analysis can be performed have this problem.

Other pertinent use cases involve a user starting with a new project in which he or she has done expense Planning but has yet to complete Revenue Planning. Since the numbers for Expense are saved, it may be used in all calculations that are run which the user might want to avoid until the Project Planning is complete. In such situations, the user would generally prefer to have the Plan in a separate area which doesn't affect others until the Plan is designated as being complete.

Sandboxes generally provide robust out-of-the-box functionality to help isolate and control changes to users' Plans without impacting Plans from other users. Changes in a particular sandbox are generally isolated from other sandboxes.

A business user can make changes to his or her Plan in a sandbox and, once satisfied, publish it back to the base version. The changes in a sandbox are typically not available to any other sandbox or to the base version until the sandbox has been published by the user. The publishing of a sandbox generally involves overwriting a base version of the Plan with the changes that were made in the sandbox.

Embodiments of the disclosed technology generally enable a user to work in a private area (e.g., different version) for creating alternate financial plans or for doing what-if analysis, for example. In such embodiments, the user's sandbox is generally not visible to others until the user wishes to make it public.

Also, the user can advantageously see both modified sandbox data and unmodified base version data in a single view (referred to herein as an aggregate view or Consolidated Data view). A user is thus able to see the impact of any changes that may be implemented in the sandbox before publishing the sandbox. Generally, only modified data is saved in the sandbox and the base version data typically remains unmodified.

Certain embodiments may include the use of a new "Hsp_View" dimension in order to differentiate a sandbox version from a base version. In such embodiments, the "Hsp_View" dimension may include at least three different views: a base view or Base Data view (e.g., visually presenting information from the base version), a sandbox view or Sandbox Data view (e.g., visually presenting information pertaining to at least one sandbox), and an aggregate view or Consolidated Data view (e.g., visually presenting the results of certain dynamic calculations that may involve data from both the base view and the sandbox view).

Features such as automatic calculation ("auto-calc") for dynamic members and automatic saving ("auto-save," e.g., when the user tabs from one cell to another cell) may be implemented in connection with certain embodiments. Such features may advantageously assist a user by enabling the user to instantaneously see the impact of any changes that may be made in the user's sandbox.

As an example, a single cell change in a sandbox can impact multiple values, e.g. changing volume for a particular product in the month of January can impact the product revenue for the year and Total revenue for the company. The user can see all of these impacts in the sandbox before publishing. One embodiment uses Hybrid BSO for doing instantaneous aggregations.

Embodiments of the disclosed technology may advantageously leverage member "on the fly" functionality. That is, an end user may be allowed to add one or more sandboxes (e.g., for different members) without needing administrative help or database restructure, for example. In such embodiments, a user may thus be able to add multiple sandboxes and compare different sandbox versions before publishing a particular sandbox.

Figure 1:
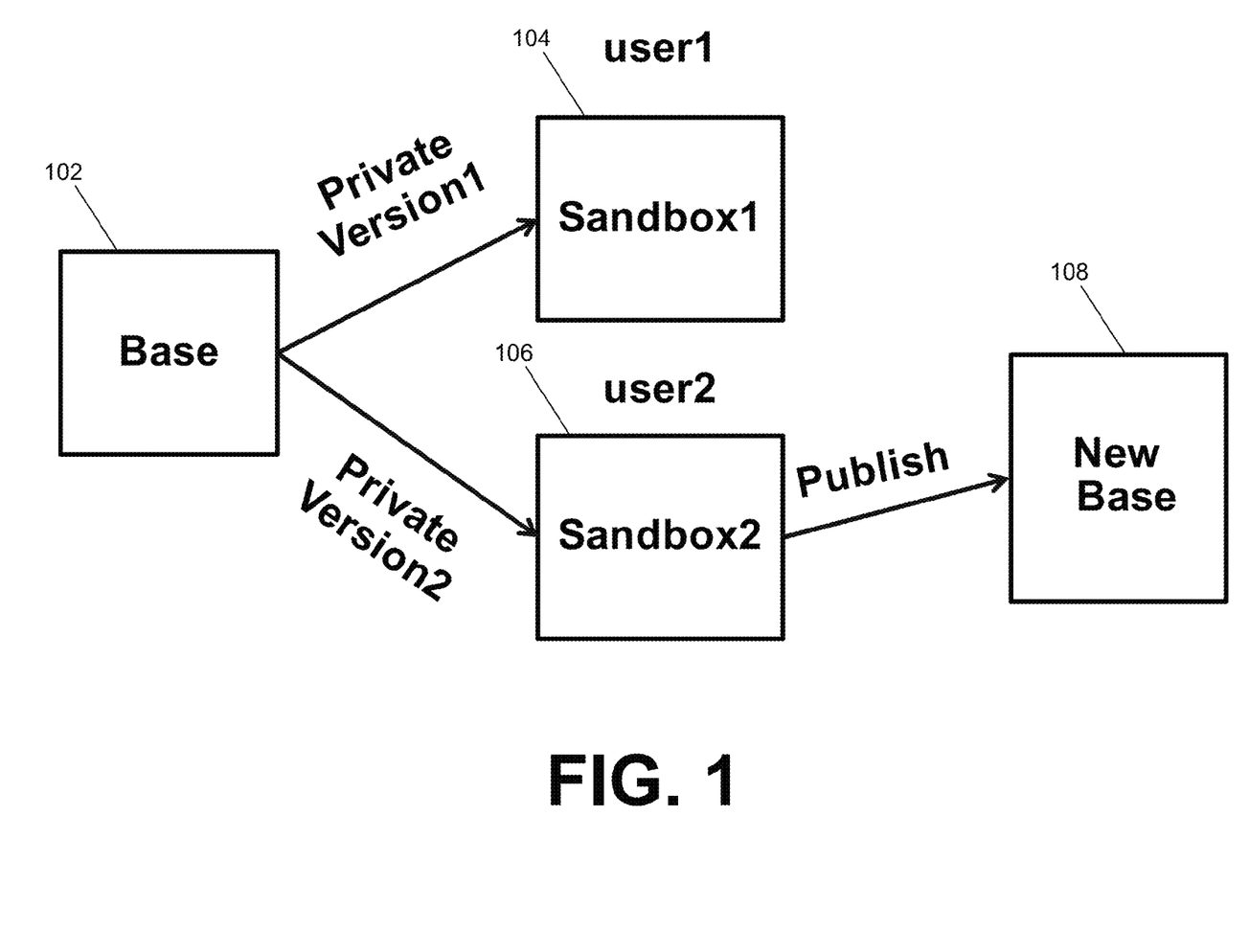
FIG. 1 illustrates a high-level example of the sandboxing process in accordance with certain embodiments of the disclosed technology.

FIG. 1 shows at a high level one embodiment of the sandboxing process. Starting with a base version, a private version is created for user 1 and a private version is created for user 2. Neither user can view the other user's private version. Each user does his or her own what-if-analysis. If the user2 what-if analysis is preferred, then the user2 version is published to replace the base version and both user1 and user2 would then be able to see the published version. In an alternate embodiment, user1 can give user2 read only or read/write access to user1's version. Thus, a collaboration capability is provided whereby the user can share the sandbox with other users.

In another embodiment, a difference version is produced between the Base Data version and, for example, the user1 version as it is modified and/or the difference version can be shown at the end of user1 modification. Further in yet another embodiment, a difference view can be shown between the user1 and user2 versions. In another example, a user can add multiple sandboxes and compare different sandbox versions before publishing a particular sandbox.

In another embodiment, a new dimension called "Hsp_View" is used to differentiate a sandbox version from the base version:

```
Hsp_View
    Hsp_Consolidated_Data View (Dynamic Calc)
    Hsp_Base_Data View
    Hsp_SandBox_Data View
```

Sandbox versions may then be created on the fly under the "Sandbox Data" member in version dimension whenever a new sandbox is created:

```
Version
    V1
    V2
    SandBoxes
        SandBoxes_V1
            SBV11
            SBV12
        SandBoxes_V2
            SBV21
```

The Base plan data is at the intersection of "Base Data View" and the base version (e.g., Working). The sandbox data is at the intersection of a respective member from the Version dimension (e.g., "Sandbox V1") and "Sandbox Data View." The following member formula on the "Consolidated Data View" member enables a user to view the modified sandbox data and unmodified base version data in a single view:

```
IF (NOT (@ismbr(@relative("Sandboxes",0))))
    BaseData;
ELSE
    IF (SandboxData== #MISSING )
        IF(@ISCHILD("Sandboxes_V1"))
            "V1"->BaseData;
        ENDIF
    Else SandboxData;
    ENDIF
ENDIF
```

Embodiments may provide greater collaboration capability by enabling a user to share a certain sandbox with other users. In such embodiments, multi-dimensional capability may be advantageously provided to the other users with whom the user has shared the particular sandbox.

FIG. 1 illustrates an example of a sandbox action default mode in accordance with certain embodiments of the disclosed technology. In the example, a first user is using a "Create New" feature in order to create a first sandbox 104 from a base version 102 by way of a sandbox creation interface, such as the interface illustrated by FIG. 2. Also in the example, a second user is using a "Create New" feature in order to create a second sandbox 106 from the base version 102. Once the second user publishes the second sandbox 106, the base version 102 is overwritten based on changes the second user made in the second sandbox 106, thus resulting in a new base version 108.

Figure 2:
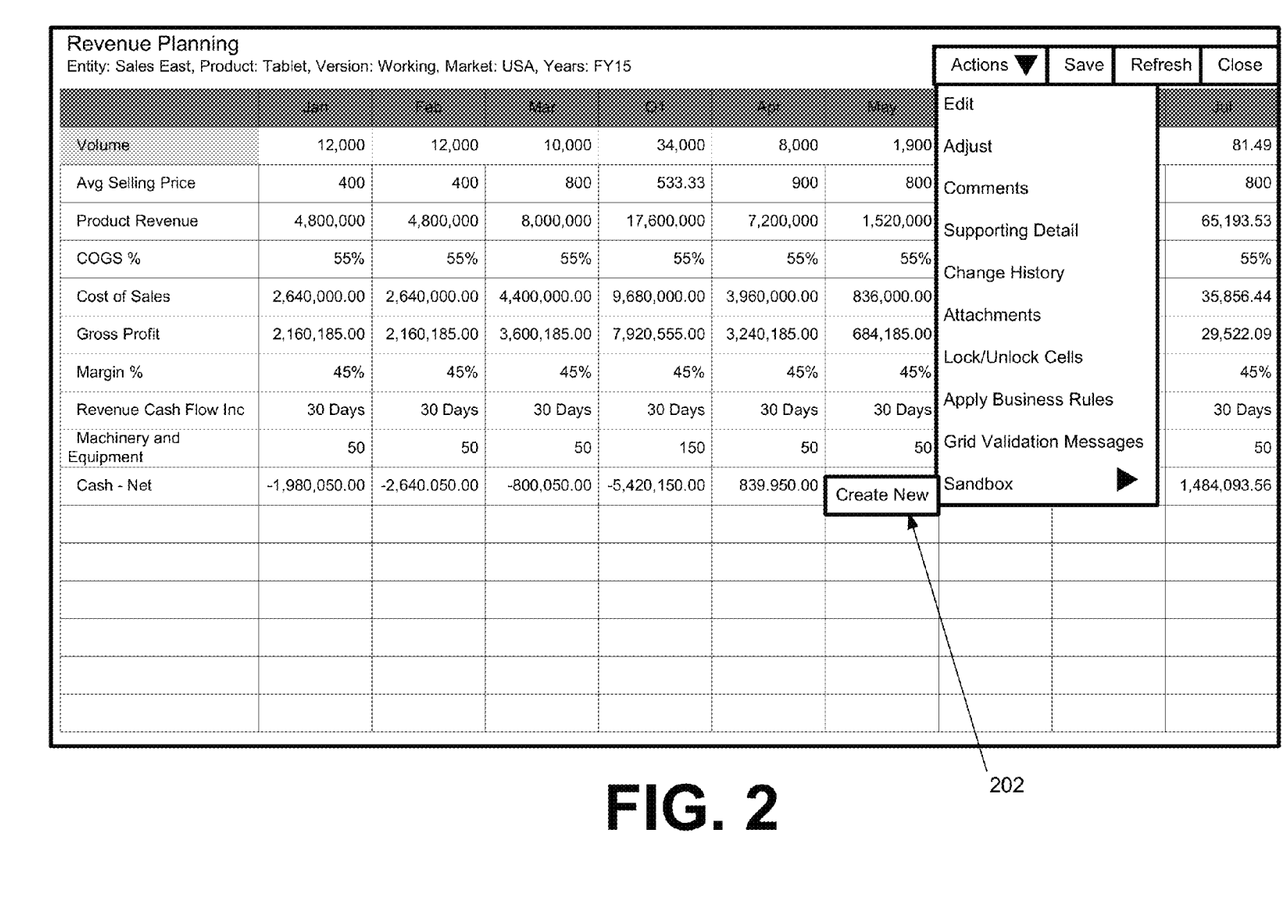
FIG. 2 illustrates an example of a sandbox action default mode in accordance with certain embodiments of the disclosed technology.

FIG. 2 illustrates an example of a "Create New" feature 202 in accordance with certain embodiments of the disclosed technology. A user may use the "Create New" feature 202 to create his or her own personal sandbox, for example.

Figure 3:
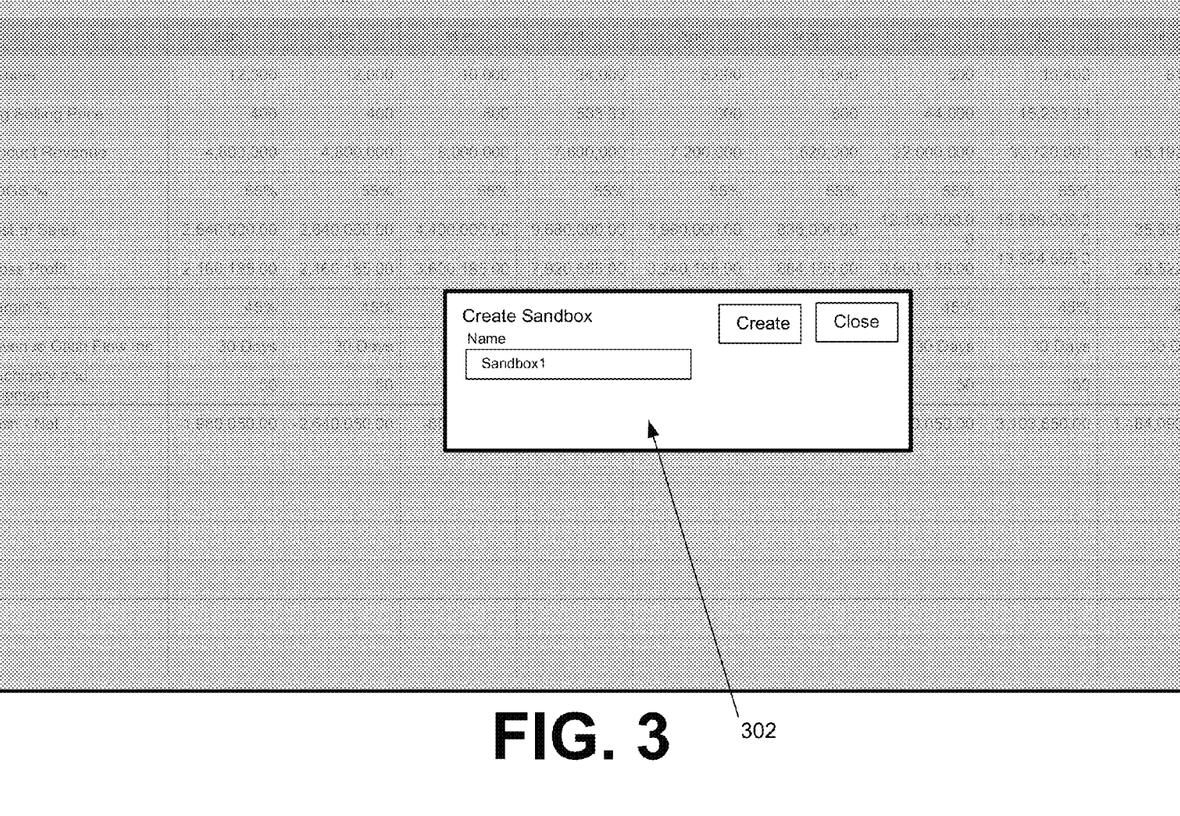
FIG. 3 illustrates an example of a sandbox creation interface in accordance with certain embodiments of the disclosed technology.

FIG. 3 illustrates an example of a sandbox creation interface 302 in accordance with certain embodiments of the disclosed technology. In the example, the sandbox creation interface 302 queries the user to provide a name for the new sandbox. Other characteristics for the sandbox may be provided by way of this interface 302. For example, the user may use the sandbox creation interface 302 for each additional sandbox that he or she may wish to create while working on a particular project.

Figure 4:
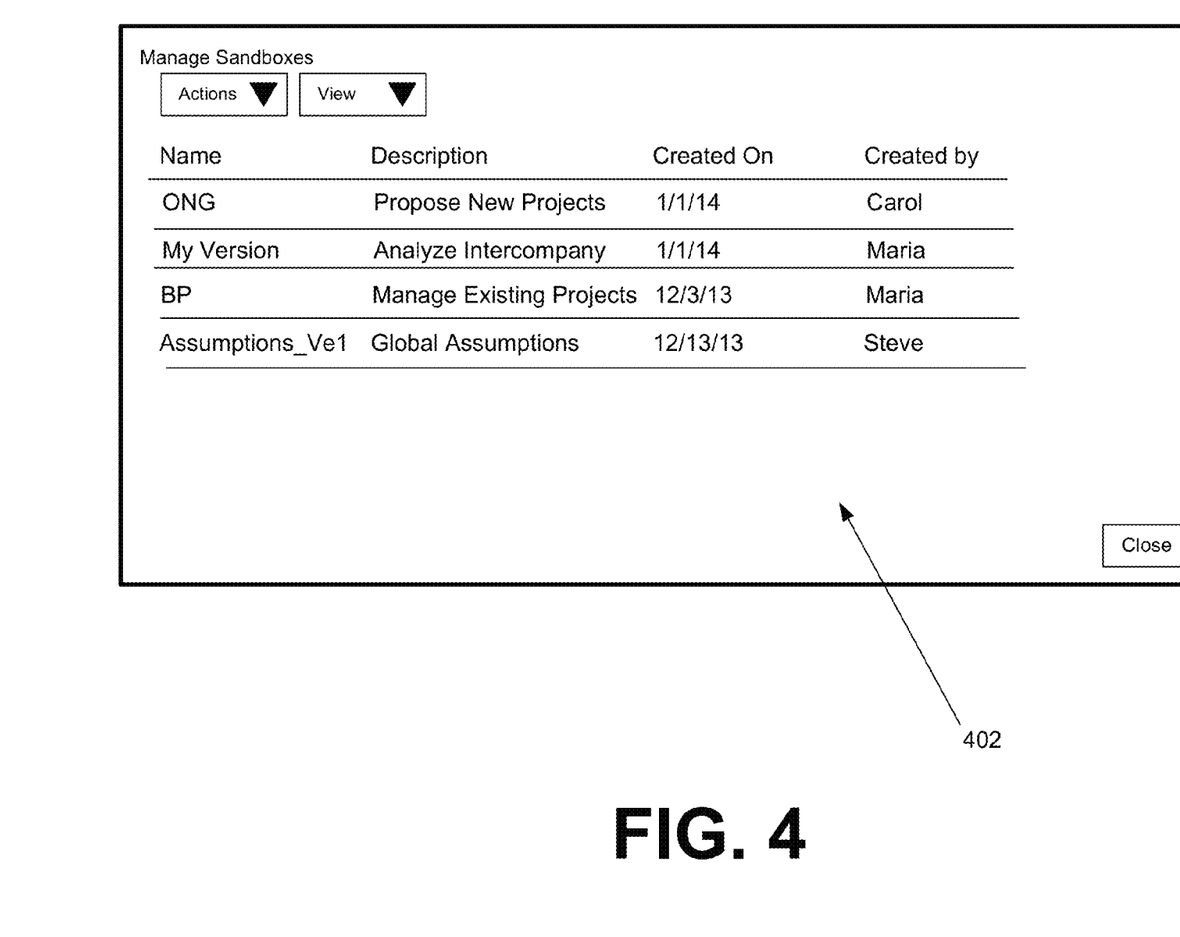
FIG. 4 illustrates an example of a sandbox management interface in accordance with certain embodiments of the disclosed technology.

FIG. 4 illustrates an example of a sandbox management interface 402 in accordance with certain embodiments of the disclosed technology. In the example, the sandbox management interface 402 presents information pertaining to each of the user's sandboxes and also provides an "Actions" feature that the Admin User may use to perform any of a number of actions on one or more of the user's sandboxes (e.g., delete, edit, or publish a selected sandbox).

Figure 5:
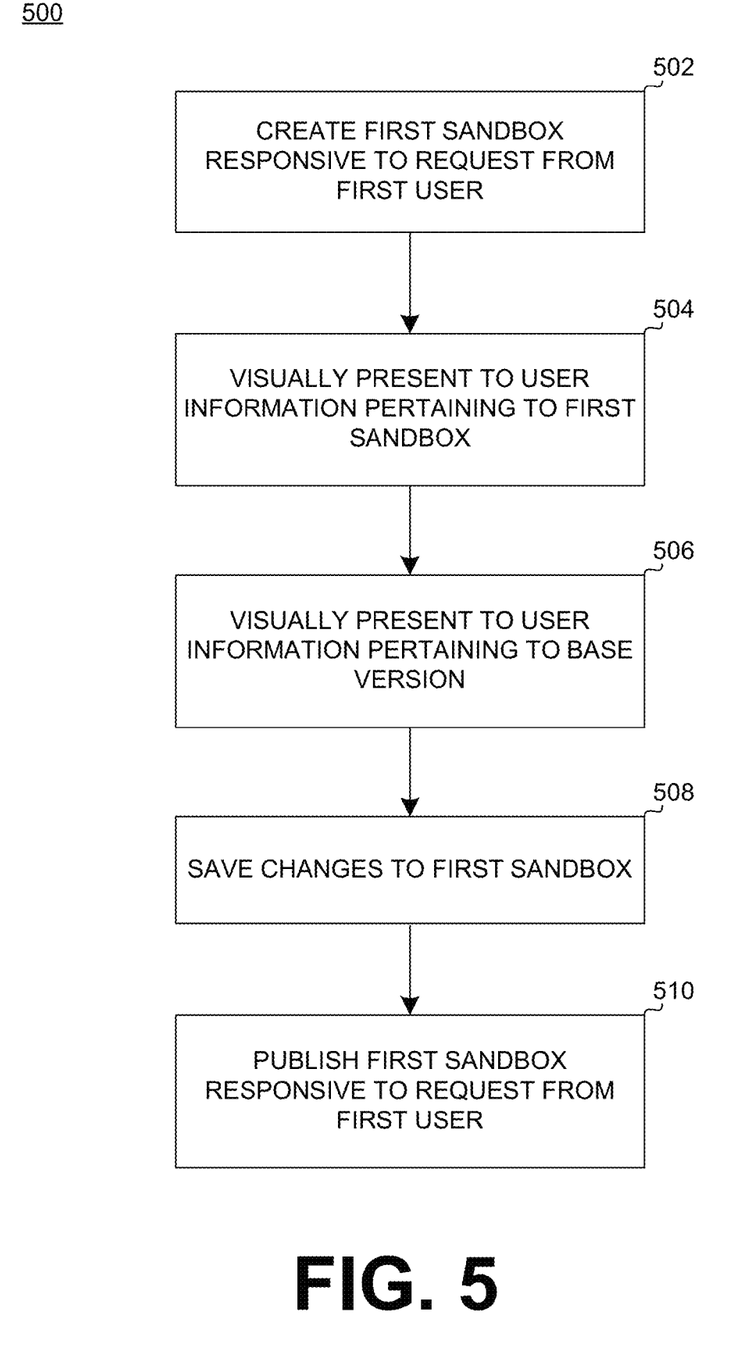
FIG. 5 illustrates an example of a computer-controlled method in accordance with certain embodiments of the disclosed technology.

FIG. 5 illustrates an example of a computer-controlled method 500 in accordance with certain embodiments of the disclosed technology. At 502, a sandbox is created (e.g., responsive to a user request to have the sandbox created). Information pertaining to the sandbox and information pertaining to a corresponding base version may be visually presented to the user, as indicated by 504 and 506, respectively. At 508, changes made to the sandbox may be saved. At 510, the sandbox may be published (e.g., responsive to a user request to publish the sandbox).

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts. Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A computer-implemented method, comprising:
creating a first sandbox responsive to a sandbox creation request received from a first user, wherein the first sandbox represents an alternate version of a base version, and further wherein the first sandbox is accessible only by the first user;
visually presenting to the first user information pertaining to the first sandbox and information pertaining to the base version;
saving changes by the first user to the information pertaining to the first sandbox;
publishing the first sandbox responsive to a publish request received from the first user so that the first sandbox may be accessed by users other than the first user;
generating a difference version that allows the first user to see an impact of the changes by the first user to the information pertaining to the first sandbox prior to the publishing, wherein the impact of the changes includes at least a first change to a value in the first sandbox as a result of the changes;
saving subsequent changes by the first user to the information pertaining to the first sandbox; and
allowing the first user to see an impact of the subsequent changes by the first user to the information pertaining to the first sandbox prior to the publishing, wherein the impact of the subsequent changes includes at least a second change to a value in the first sandbox as a result of the subsequent changes.

2. The computer-implemented method of claim 1, wherein publishing the first sandbox includes overwriting the base version with the changes by the first user to the information pertaining to the first sandbox.

3. The computer-implemented method of claim 1, further comprising:

prior to the publishing, creating a second sandbox responsive to a sandbox creation request received from a second user, wherein the second sandbox represents another alternate version of the base version, and further wherein the second sandbox is accessible only by the second user.

4. The computer-implemented method of claim 3, further comprising:
visually presenting to the second user information pertaining to the second sandbox and information pertaining to the base version.

5. The computer-implemented method of claim 4, further comprising:
saving changes by the second user to the information pertaining to the second sandbox.

6. The computer-implemented method of claim 5, further comprising:
generating another difference version that allows the second user to see an impact of the changes by the second user to the information pertaining to the second sandbox.

7. The computer-implemented method of claim 6, further comprising:
publishing the second sandbox responsive to a publish request received from the second user so that the second sandbox may be accessed by users other than the second user.

8. The computer-implemented method of claim 7, wherein publishing the second sandbox includes overwriting the base version with the changes by the second user to the information pertaining to the second sandbox.

9. The computer-implemented method of claim 1, further comprising:
prior to the publishing, creating a second sandbox responsive to an additional sandbox creation request received from the first user, wherein the second sandbox represents another alternate version of the base version, and further wherein the second sandbox is accessible only by the first user.

10. The computer-implemented method of claim 9, further comprising:
visually presenting to the first user information pertaining to the second sandbox and information pertaining to the base version.

11. The computer-implemented method of claim 10, further comprising:
saving changes by the first user to the information pertaining to the second sandbox.

12. The computer-implemented method of claim 11, further comprising:
generating another difference version that allows the first user to see an impact of the changes by the first user to the information pertaining to the second sandbox.

13. The computer-implemented method of claim 12, further comprising:
publishing the second sandbox responsive to a publish request received from the first user so that the second sandbox may be accessed by users other than the second user.

14. The computer-implemented method of claim 13, wherein publishing the second sandbox includes overwriting the base version with the changes by the first user to the information pertaining to the second sandbox.

15. The computer-implemented method of claim 1, wherein the first sandbox pertains to a financial planning application.

16. One or more tangible, non-transitory computer-readable media containing computer-executable instructions that, when executed by a processor, cause the processor to perform a method comprising:
creating a first sandbox responsive to a sandbox creation request received from a first user, wherein the first sandbox represents an alternate version of a base version, and further wherein the first sandbox is accessible only by the first user;
visually presenting to the first user information pertaining to the first sandbox and information pertaining to the base version;
saving changes by the first user to the information pertaining to the first sandbox;
publishing the first sandbox responsive to a publish request received from the first user so that the first sandbox may be accessed by users other than the first user;
generating a difference version that allows the first user to see an impact of the changes by the first user to the information pertaining to the first sandbox prior to the publishing, wherein the impact of the changes includes at least a first change to a value in the first sandbox as a result of the changes;
saving subsequent changes by the first user to the information pertaining to the first sandbox; and
allowing the first user to see an impact of the subsequent changes by the first user to the information pertaining to the first sandbox prior to the publishing, wherein the impact of the subsequent changes includes at least a second change to a value in the first sandbox as a result of the subsequent changes.

17. A system, comprising:
a processor configured to create a first sandbox responsive to a sandbox creation request received from a first user, wherein the first sandbox represents an alternate version of a base version, and further wherein the first sandbox is accessible only by the first user, and generate a difference version that allows the first user to see an impact of changes by the first user to the information pertaining to the first sandbox, wherein the impact of the changes includes at least a first change to a value in the first sandbox as a result of the changes;
a display device configured to visually present to the first user information pertaining to the first sandbox and information pertaining to the base version; and
a memory configured to save changes by the first user to the information pertaining to the first sandbox as well as subsequent changes by the first user to the information pertaining to the first sandbox, wherein the processor is further configured to publish the first sandbox responsive to a publish request received from the first user so that the first sandbox may be accessed by users other than the first user and allow the first user to see an impact of the subsequent changes by the first user to the information pertaining to the first sandbox prior to the publishing, wherein the impact of the subsequent changes includes at least a second change to a value in the first sandbox as a result of the subsequent changes.

* * * * *

UNITED STATES PATENT AND TRADEMARK OFFICE
CERTIFICATE OF CORRECTION

PATENT NO. : 9,633,200 B2
APPLICATION NO. : 14/865164
DATED : April 25, 2017
INVENTOR(S) : Kulkarni et al.

It is certified that error appears in the above-identified patent and that said Letters Patent is hereby corrected as shown below:

In the Specification

In Column 3, Line 50, delete "user 1" and insert -- user1 --, therefor.

In Column 3, Line 51, delete "user 2." and insert -- user2. --, therefor.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*